Sept. 7, 1926. 1,598,642
H. C. FREETAG ET AL
FROST AND THEFT PROOF MILK BOTTLE CONTAINER
Filed Dec. 27, 1924
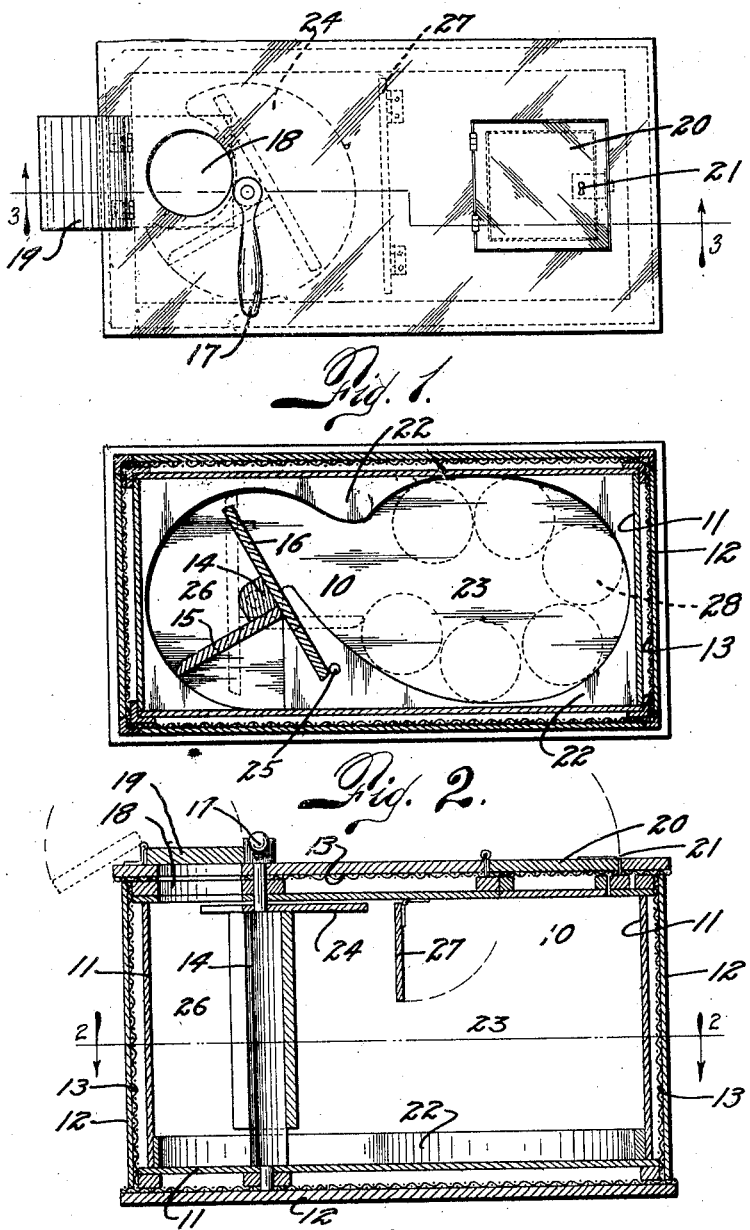
INVENTORS
HENRY C. FREETAG &
JOSEPH M. HOLLAND
BY
ATTORNEY.

Patented Sept. 7, 1926.

1,598,642

UNITED STATES PATENT OFFICE.

HENRY C. FREETAG AND JOSEPH M. HOLLAND, OF DENVER, COLORADO.

FROST AND THEFT PROOF MILK-BOTTLE CONTAINER.

Application filed December 27, 1924. Serial No. 758,417.

This invention relates to a container for the reception of milk bottles as they are distributed by the milk dealer to the customer, and has for its primary object the provision of a container from which the bottles cannot be removed by any unauthorized person, after they have been once placed therein.

A further object of the invention is to so construct the container that freezing of the milk therein, will be practically eliminated.

Other objects and advantages reside in the detail construction of the invention, which result in simplicity, economy, and efficiency, and which will become more apparent from the following description.

In the following detailed description of the invention reference is had to the accompanying drawing which forms a part hereof. Like numerals refer to like parts in all views of the drawing and throughout the description.

In the drawing:

Fig. 1 is a plan view of our improved milk bottle container.

Fig. 2 is a horizontal cross section through the same taken on the line 2—2, Fig. 3.

Fig. 3 is a vertical cross section taken on the line 3—3, Fig. 1.

The invention comprises a box 10, of unusual construction. The box 10 comprises an inner container 11 spaced from an outer housing 12 so as to allow a continuous air space to entirely surround the box 10. On the inner face of the housing 12 a layer of asbestos or other heat insulation 13 is placed. This method of construction is continued throughout the entire device, including the lid. The inner container 11 contains what might be broadly termed an operating compartment 26 and a storage compartment 23.

Passing vertically through the box 10 is a rectangular shaft 14 to which is attached a long blade 16 and a short blade 15. The shaft 14 is operated by means of a handle 17 on the exterior top of the box 10. A circular opening 18 is formed in the top of the box 10 of the proper size to receive milk bottles. This opening 18 is so positioned that the milk bottle enters the box 10 between the blades 15 and 16 when they are in the position illustrated in Fig. 2. The opening 18 is closed by means of a hinged lid 19. For the removal of the bottle from the box 10, a second lid 20 is arranged in the top of the box 10 and provided with a lock 21.

In operation, a bottle is passed through the opening 18, and the handle 17 is rotated in the direction of the arrow in Fig. 1. This causes the short blade 15 to carry the bottle around the shaft 14. The bottle is directed by a circular guide 22, against which it contacts, into the storage compartment 23. As the shaft 14 rotates, a sector-shaped slide 24 will pass under the opening 18 thereby closing this opening. The handle 17 is now returned to its former position. A second bottle similarly introduced, will contact with the first placed bottle forcing it further into the storage compartment 23. As additional bottles are placed in the box the preceding bottles will be forced in a train, guided by the guide 22, around the storage compartment 23, as indicated in Fig. 2. A hinged flap 27 depends from the top of the box. As the bottles are pushed around they tend to drag on the bottom of the box and the guides, thus causing a tendency for the top of the bottles to fall forwardly, causing the bottles to overturn at times as they leave the blade. The flap 27 acts to retard the top of the bottles and prevent them from thus overturning. Each bottle will raise this flap and allow it to fall behind as they enter the storage compartment 23.

It will be noted that should the user neglect to return the handle to the original position, the opening will be effectually closed by the slide 24. The handle must be returned in order to close the door 19. After the bottles are once in the storage compartment 23, they cannot be reached from the exterior, since there is insufficient space between the long blade 16 and the wall of the box to allow the removal of a bottle. And should the long blade 16 be turned so as to allow sufficient space the slide 24 will have closed the opening 18. A stop 25 limits the movement of the shaft 14.

While a specific form of the improvement has been described and illustrated herein, it is desired and understood that the same may be varied, within the scope of the appended claims, without departing from the spirit of the invention.

Having thus described the invention, what we claim and desire secured by Letters Patent is:—

1. The combination in a theft proof milk bottle container of a vertical shaft having blades fixed thereon, an opening in the top of said container to allow a milk bottle to be placed between said blades and a handle arranged to rotate said blades so as to pass said bottles away therefrom, one of said blades being arranged to prevent access from said opening to said container at any position of said blades.

2. In a milk bottle container having an operating compartment and a receiving compartment, the combination of a depending swinging member arranged to contact with the top of the bottles and prevent overturning of the milk bottles as they pass from the operating to the receiving compartment.

In testimony whereof, we affix our signatures.

HENRY C. FREETAG.
JOSEPH M. HOLLAND.